United States Patent [19]

Hodge et al.

[11] 4,143,418
[45] Mar. 6, 1979

[54] CONTROL DEVICE AND METHOD FOR READING A DATA CHARACTER FROM A COMPUTER AT A FAST RATE AND TRANSMITTING THE CHARACTER AT A SLOW RATE ON A COMMUNICATION LINE

[75] Inventors: Gordon W. Hodge; Ted D. Nye, both of Salt Lake City, Utah

[73] Assignee: Sperry Rand Corporation, New York, N.Y.

[21] Appl. No.: 835,130

[22] Filed: Sep. 21, 1977

[51] Int. Cl.² ............................ G06F 3/04; G06F 5/06
[52] U.S. Cl. .................................. 364/200; 307/271; 307/DIG. 1
[58] Field of Search ... 364/200 MS File, 900 MS File; 307/271, DIG. 1; 179/15 A, 15 AF, 15 AL, 15 AV, 15.55 R, 15.55 T; 358/260, 134; 325/42, 65

[56] References Cited

U.S. PATENT DOCUMENTS

| | | | |
|---|---|---|---|
| 3,135,947 | 6/1964 | Grondin et al. | 364/900 |
| 3,373,418 | 3/1968 | Chan | 364/200 |
| 3,395,399 | 7/1968 | Goodenow | 364/900 |
| 3,407,389 | 10/1968 | Klein | 364/900 |
| 3,416,141 | 12/1968 | DeCastro | 364/200 |
| 3,434,117 | 3/1969 | Gibson et al. | 364/900 |
| 3,497,627 | 2/1970 | Blasbalg et al. | 307/DIG. 1 |
| 3,508,207 | 4/1970 | Shigaki | 364/900 |
| 3,573,740 | 4/1971 | Berger et al. | 364/200 |
| 3,623,010 | 11/1971 | Burkhalter | 364/200 |
| 3,696,338 | 10/1972 | Preiss | 364/200 |
| 3,699,529 | 10/1972 | Beyers et al. | 364/200 |
| 3,725,866 | 4/1973 | Oldfield, Jr. et al. | 364/200 |
| 3,755,788 | 8/1973 | Finch | 364/200 |
| 3,879,582 | 4/1975 | White et al. | 179/15 AL |
| 3,950,735 | 4/1976 | Patel | 364/200 |
| 3,975,763 | 8/1976 | Kitamura | 179/15.55 T |
| 3,980,993 | 9/1976 | Bredart et al. | 364/200 |
| 4,003,032 | 1/1977 | Austin et al. | 364/200 |
| 4,050,097 | 9/1977 | Miu et al. | 364/200 |

OTHER PUBLICATIONS

Poulet, "Interface Between Two Transmission Lines Having Different Transmission Speeds" in *IBM Tech. Discl. Bull.*, vol. 16, No. 11, Apr. 1974; pp. 3618-3620.
Roberts, "Interfacing a Teletypewriter with an IC Microprocessor" in *Electronics*, Jul. 25, 1974; p. 96.
Rowe, "Interfacing Educ-8 to Teleprinters & Mag. Tape" in *Electronics Australia*, Jul. 1975, pp. 69-73, 107.

*Primary Examiner*—Melvin B. Chapnick
*Attorney, Agent, or Firm*—John P. Dority; William E. Cleaver; Marshall M. Truex

[57] ABSTRACT

A data rate control device interfacing between a computer and a communication line facilitates reading out of data from the computer at a fast rate and then transmitting that data at a slow rate on the communication line with allowance being made between data transmissions for reflections and echoes on the line to die down. The control device includes a clock generator, control logic and a clock transmitter for sending out Fast Clocks and causing the serial reading in of data to a shift register of the control device. Once the presence of one character of data is detected in the register by the control logic, the Fast Clocks are terminated and Slow Clocks are sent to the register for serial reading out of the data character to a loop transmitter of the control device for transmission of the data character on the communication line. A counter in the control device monitors the generation of Slow Clocks so as to facilitate the operation of the control logic in changing back to Fast Clocks after transmission of the data character. Further, the counter will prevent the transmission of a successive character of data until there has been a lapse of sufficient time between data transmissions for reflections on the line to die down.

4 Claims, 8 Drawing Figures

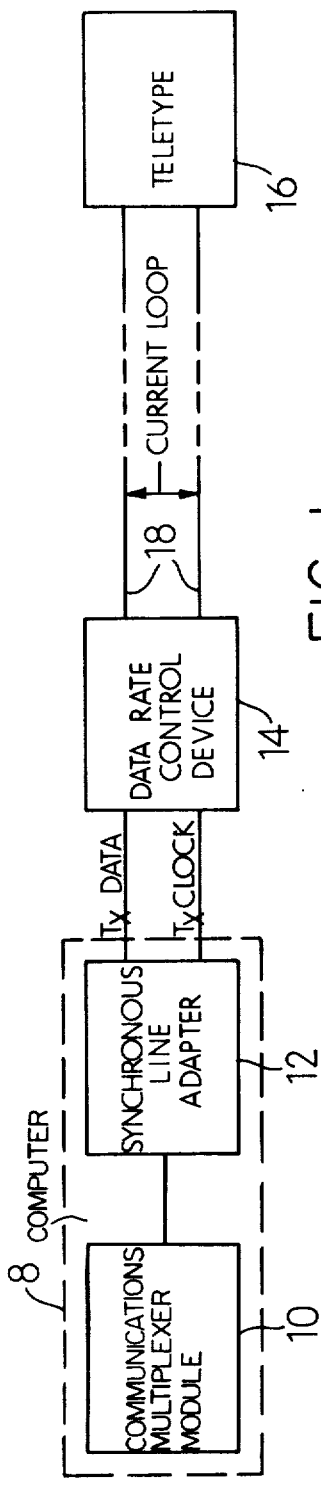
FIG. 1
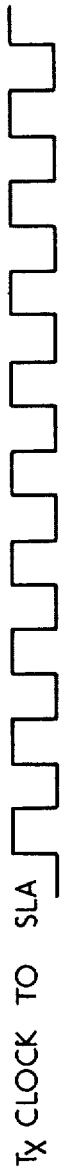
FIG. 7
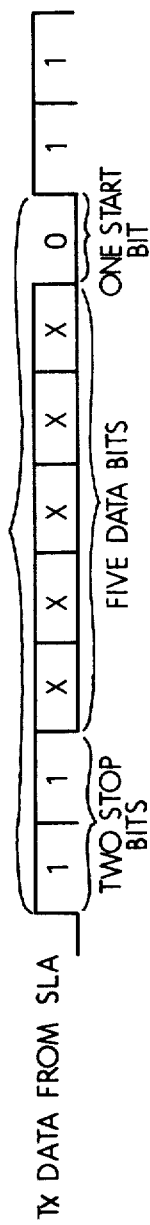
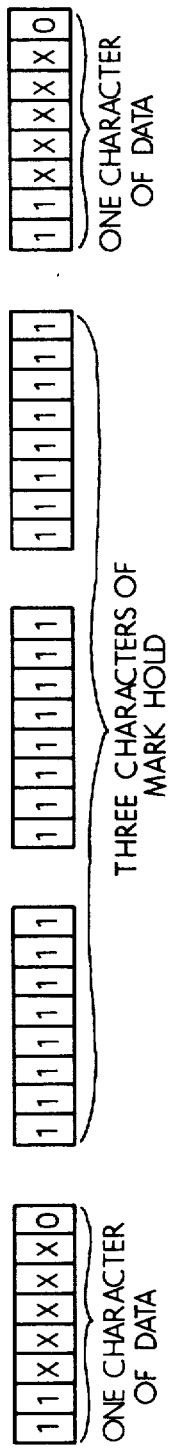
FIG. 8

CONTROL DEVICE AND METHOD FOR READING A DATA CHARACTER FROM A COMPUTER AT A FAST RATE AND TRANSMITTING THE CHARACTER AT A SLOW RATE ON A COMMUNICATION LINE

BACKGROUND OF THE INVENTION

1. Field of the Invention

The present invention broadly relates to the transmission of data from a computer to a remotely located terminal over a communication line and, more particularly, is concerned with a data rate control device which interfaces between the computer and the communication line and is operable to read data out of the computer fast and then slowly transmit it over the line.

2. Description of the Prior Art

In a communication system in which data is transmitted from a computer over a communication line to a terminal at a remote or distant location, such as a Teletype machine, it is desirable to transmit the data out slowly in order to allow time for reflections and echoes from the data to die down on the line. However, the slow reading out of data from the computer ties up an inordinate amount of its time which is expensive.

One alternative is to provide an external buffer memory connected to the computer to receive all of the data from it at a fast rate and store the data. Then the data will be read out from the buffer memory and transmitted slowly on the communication line. While such memory reduces the amount of computer time taken up in reading out of the data, it must have considerable storage capacity which is costly also. Therefore, this alternative merely results in shifting the cost without reducing it significantly.

SUMMARY OF THE INVENTION

The present invention obviates the foregoing disadvantages of the prior art by providing a data rate control device which facilitates the reading out of data from the computer at a fast rate and then transmitting that data at a slow rate on the communication line with allowance being made between data transmissions for reflections and echoes on the line to die down. The amount of time that the computer is tied up during reading out of data is minimized, and the necessity of providing high cost temporary buffer memory of the data is avoided by the present invention. The device may be easily constructed on a standard size printed circuit board from commercially available electronic components.

Accordingly, in a communication system including a computer for generating data for transmission on a communication line to a remotely-located terminal, the improvement provided by the present invention comprises a data rate control device interfacing between the computer and the communication line and being operable to read data out from the computer at a fast rate and then transmit that data at a slow rate on the communication line. Further, the control device is operable to hold up each successive transmission of data until there has occurred a lapse of sufficient time between successive data transmissions for reflections and echoes on the communication line to die down.

The data rate control device includes control means having two states, a first data receiving state and a second data transmitting state, first means for reading in data from the computer at a fast rate when the control means is in its first state, second means for reading out data onto the communication line at a slow rate when the control means is in its second state, and monitoring means for changing the control means from its first to second state in response to sensing when a predetermined amount of data has been read in by the first means and for changing the control means from its second to first state in response to sensing when the data has been read out by the second means. Also, after each instance when the monitoring means has caused the control means to change from its second to first state, the monitoring means will prevent the control means from again changing back to its second state until a sufficient predetermined amount of time has passed to allow reflections of the data read out on the communication line to die down.

More particularly, the data rate control device includes a register for storing a predetermined amount of data, means for generating clocks at a fast rate to the computer to cause the reading in of data from the computer to the register and means for monitoring the register so as to terminate the generation of fast clocks and reading in of data when a predetermined amount of data is detected in the register. The generating means is also for generating clocks at a slow rate to the register to cause the reading out of the data therefrom in response to detection of the predetermined amount of data in the register. Means is also provided for transmitting the data read out from the register onto the communication line. The monitoring means is also for monitoring the generation of slow clocks so as to terminate the same and initiate the generation of fast clocks for the reading in of data to the register in response to the transmission of the preceding data. Also, the data rate control device includes means for preventing the generation of slow clocks to the register when the succeeding predetermined amount of data has been detected therein, until after the lapse of sufficient time from the preceding data transmission for reflections on the line to die down.

BRIEF DESCRIPTION OF THE DRAWINGS

FIG. 1 is a block diagram illustrating the overall communication system in which is used the data rate control device of the present invention.

FIGS. 7 and 8 illustrate in graph form the various data characters and pulses associated with the control device.

DETAILED DESCRIPTION OF THE INVENTION

Referring to FIG. 1, there is shown a communication system having a conventional computer 8 which includes a communications multiplexer module (CMM) 10 and a synchronous line adapter (SLA) 12 connected to one of the ports of the CMM 10. Also, the system includes a data rate control device 14 of the present invention which reads out data from the CMM 10 through the SLA 12. The control device 14, in turn, is interconnected for data transmission in only one direction to a remotely located Teletype machine (TTY) 16 of the system by a communication line 18 which provides a current loop between the control device 14 and the TTY 16.

The SLA 12 is used in an asynchronous mode. The data rate control device 14 sends a Transmit Clock, Tx, to the SLA 12. On the positive going edge of the Tx Clock, the SLA 12 sets up (frames) a bit; and on the negative going edge of the Tx Clock, the bit is transmitted over and read into the control device 14 on the Tx Data line. Thus, bits are serially transmitted and read into the control device 14 from the CMM 10 through the SLA 12 in response to the Tx Clocks generated by the control device 14 and transmitted to the SLA 12. The Tx Clocks are generated at a fast rate, so the reading in of data correspondingly takes place at a fast rate.

Figure 2:
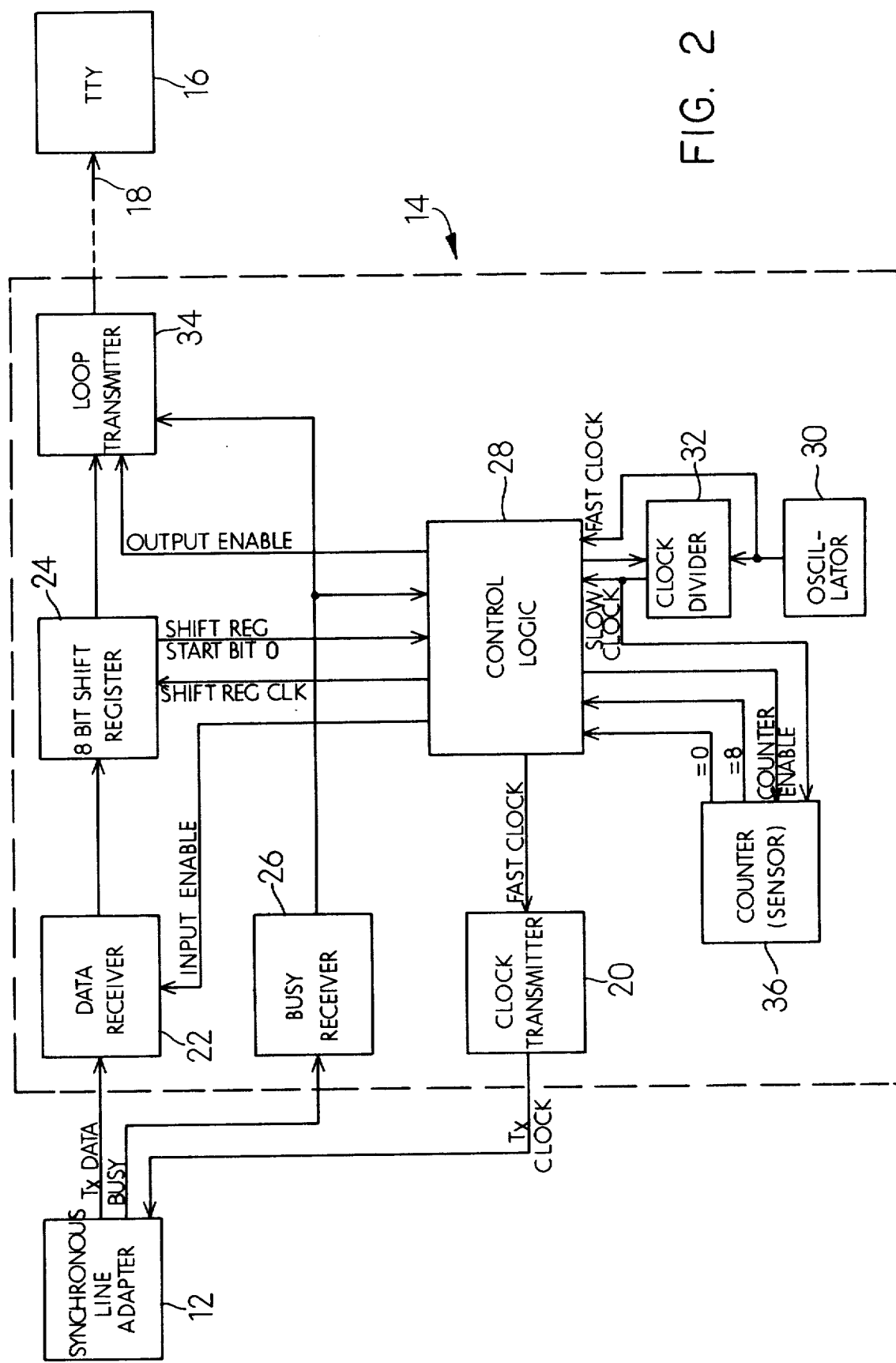
FIG. 2 is a block diagram of the basic parts of the control device itself.

Turning now to FIG. 2, which illustrates the components of the control device 14 in schematic block form, it is seen that the Tx Clocks are generated by a clock transmitter 20 in the control device 14, while each of the respective bits of data set up and transmitted by the SLA 12, as a result of each of the Tx Clocks, is read into the control device 14 by a data receiver 22 therein and then through the receiver 22 to an eight bit shift register 24 of the control device 14. Thus, as each bit of data is transmitted over from the SLA 12, it is received and shifted into the register 24.

For shifting the serial data into the register 24, Fast Clocks are also applied to the register 24 through control logic 28 in the data rate control device 14. This will insure that the data bits will be shifted into the register 24 at a rate which corresponds to the rate at which the data bits are read into the data receiver 22 by the Tx Clocks. An oscillator 30 in the control device 14 generates the Fast Clocks. The control logic 28, in turn, passes the Fast Clocks on to the register 24 for reading in of data and to the clock transmitter 20 for causing generation of the Tx Clocks.

The shifting in of data bits into one end of the register 24 will continue until a data bit 0 appears at the other end of the register 24. Turning for the moment to FIG. 7, there is shown the pulse form of the Tx Clocks and Tx Data. Since the SLA 12 is running in asynchronous mode, it will frame the Tx Data such that one character of data is eight bits in length and composed of one start bit being a binary 0, followed by five data bits (which will be composed of some combination of binary 0s and 1s), and ending up with two stop bits, each being a binary 1. Thus, when the start bit 0 appears at the other end of the register 24, that means that the register 24 is filled up with one character of data. Such appearance of the bit 0 is sensed by control logic 28 which then disables the clock transmitter 20 so that it stops transmitting Tx Clocks to the SLA 12 and, as a consequence, Tx Data ceases to be read out of the SLA 12 and into the data receiver 22. In other words, at that point, no more data is shifted into the register 24.

Also, when the start bit 0 is sensed, the control logic 28 disables the Fast Clocks and enables Slow Clocks from a clock divider 32 to be applied to the register 24 which causes the character of data in the register 24 to be read out of the register 24 at the slow rate. Further, concurrently, the control logic 28 enables a loop transmitter 34 in the control device 14 for transmission of the data bits, being read out of the register 24 by the Slow Clocks, on the communication line 18 coupled to the loop transmitter 34 to the distantly located TTY 16. Still further, simultaneously, the control logic 28 enables a counter 36 (being initialized at zero) in the control device 14, to begin, in effect, counting the bits in the character of data, as they are read out of the register 24, since the Slow Clocks are also applied to and sensed by the counter 36.

Upon the count of the counter 36 reaching eight (meaning that all of the bits of the character of data have been read out of the register 24), the control logic 28, which is monitoring the count, will disable the loop transmitter 34 which will effectively place it in a mark hold condition. A mark hold condition is represented as a binary 1. The counter 36 keeps counting until it reaches thirty-one, upon which it reinitializes back to zero. Thus, the counter 36 counts twenty-four more Slow Clocks after the register 24 has been emptied of data, which represents three characters of mark hold (each being comprised of eight binary 1s as seen in FIG. 8). The three characters of mark hold represent the time interval of wait or delay after each character of data is transmitted on the communication line 18 which will allow time for any reflections and echoes on the line 18 to die down before the next character of data is transmitted.

When the counter 36 reaches a count of thirty-one and automatically reinitializes back to zero, the control logic 28, which is still monitoring the count, will disable the counter 36 and thereby hold it at zero. However, before the thirty-one count is reached by the counter 36 and, in particular, as soon as the count reaches eight, the control logic 28 enables the clock transmitter 20 and the data receiver 22 to start reading in more data from the SLA 12. Simultaneously, the control logic 28 changes the Clocks applied to the shift register 24 back to the fast rate in correspondence to the rate of the Tx Clocks being generated by the clock transmitter 20. Thus, bits begin to be shifted into the register 24 before the counter 36 reaches a count of thirty-one and while the loop transmitter 34 is being held in the mark hold condition.

When the start bit 0 appears at the other or low end of the register 24, the clock transmitter 20 and data receiver 22 are disabled by the control logic 28, and no more bits are shifted into the register 24, as described above. This situation may occur before the counter 36 has reached a count of thirty-one and reinitialized back to zero. If it does occur, the control logic 28 disables the Fast Clocks to the shift register 24 and does not enable Slow Clocks to it until a zero count is reached, at which time the control logic 28 will again enable the loop transmitter 34 and begin the slow reading out of the character of data from the register 24 and transmission thereof by the loop transmitter 34, as described above.

It should be mentioned here that at any time when the control device 14 is in either its receiving or transmitting state, another receiver 26 in the device 14 may receive a Busy signal from the SLA 12 which will disable the device 14 for the duration of the Busy signal. The Busy signal is a break condition which is represented by a binary 0 hold condition on the communication line 18 and interpreted by the TTY 16 as an instruction that the computer 8 does not want to receive any data from the TTY 16 which is normally being sent to the computer 8 by the TTY 16 on another communication line (not shown). When the Busy signal is terminated, the control device 14 is enabled and continues its operation where it left off when the Busy signal was received.

Figure 3:
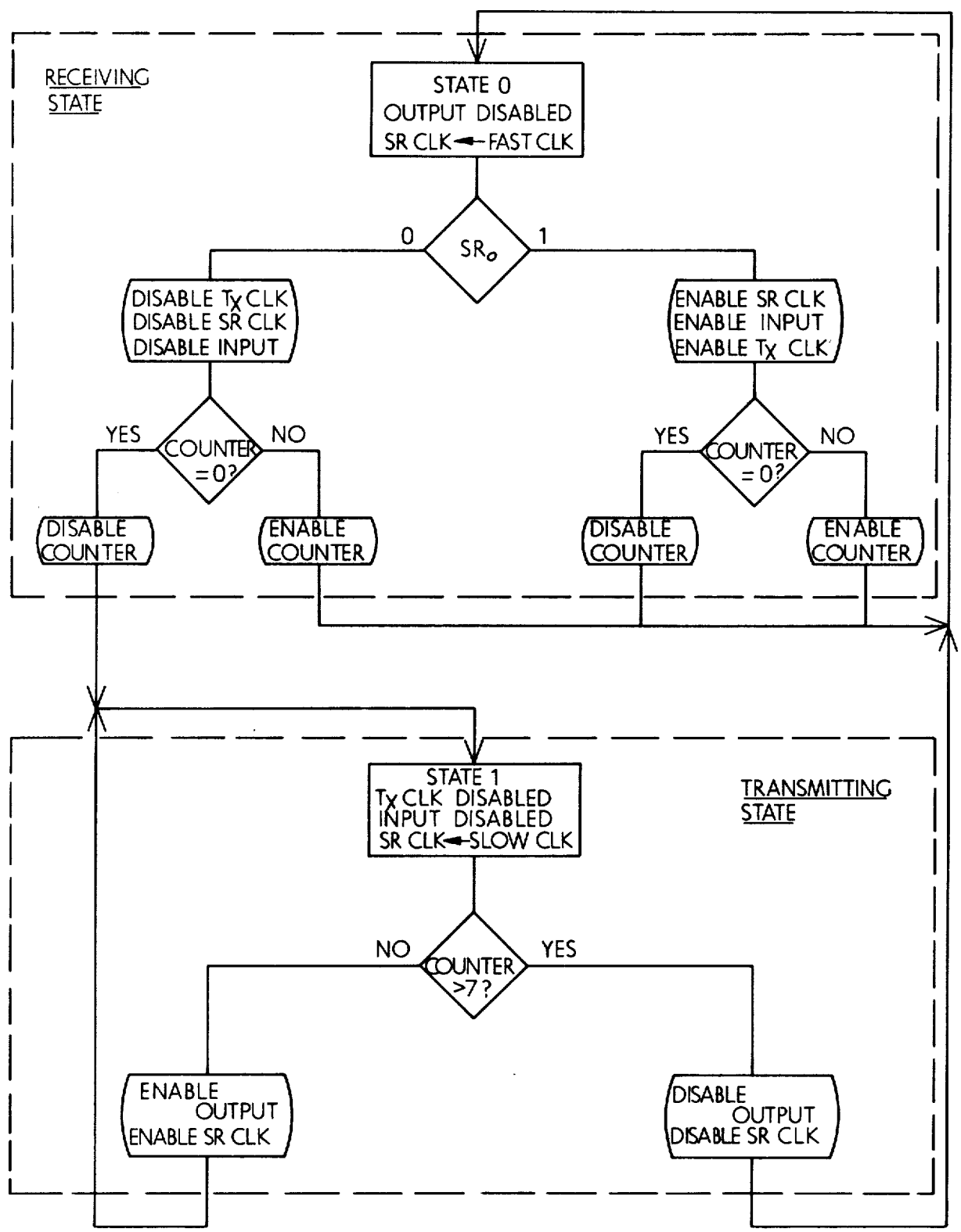
FIG. 3 is a flowchart illustrating the data receiving and transmitting states of the control device.

Referring now to the flowchart representation of the data rate control device 14 as illustrated in FIG. 3, state 0 is the receiving state of device 14, while state 1 is the transmitting state.

When the control device 14 is in its receiving state 0, fast Tx Clocks go to the SLA 12 from the clock transmitter 20, and Fast Clocks are enabled to the shift register 24 by the control logic 28. Thus, bits are being shifted into the register 24 at its high end, and the control logic 28 is looking for the appearance of a start bit 0 at the low end of the register 24. The low end of the register 24 is represented in the flowchart by a diamond-shaped box captioned "$SR_O$". As long as a binary "1" is indicated at $SR_O$, the Tx Clocks to the SLA 12 and the Fast Clocks to the register 24 remain enabled.

Also, as bits are being shifted into the register 24, the counter 36 may still be counting up to thirty-one which means that the loop transmitter 34 is still being held in mark hold condition. The counter 36 is represented in the receiving state portion of the flowchart by both diamond-shaped boxes captioned with the question: "Counter = 0?" If the count reaches thirty-one and then is reinitialized to zero while binary 1s are continuing to appear at $SR_O$ (indicating a "YES" decision on the "1" branch from $SR_O$), then the counter 36 and the mark hold condition of the loop transmitter 34 are disabled and the counter 36 is held at zero while the reading in of bits and shifting of the same into the register 24 continues.

Once a binary "0" (a start bit 0) appears at $SR_O$, the Fast Clocks to the register 24 and the Tx Clocks to the SLA 12 are disabled, and thus the input to the control device 14 is disabled. If the count of the counter 36 has not yet reached thirty-one and reinitialized to zero (indicating a "NO" decision on the "0" branch from $SR_O$), the loop transmitter 34 is still in mark hold condition, and the control device 14 must wait in its receiving state 0, even though it is not receiving any more data. As soon as the counter 36 reinitializes to zero (indicating a "YES" decision on the "0" branch from $SR_O$), the mark hold condition of the loop transmitter 34 is disabled and the control device 14 enters its transmitting state 1. Of course, if the counter 36 had already been at zero when the start bit 0 appeared at $SR_O$, then the device 14 would have gone immediately into its transmitting state 1.

When the control device 14 is in its transmitting state 1, the counter 36 and loop transmitter 34 are enabled by the control logic 28 and Slow Clocks are now applied to the register 24 by the control logic 28 to read out the character of data to the transmitter 34 and transmit the character on the communication line 18 to the TTY 16. As the data is read out, the counter 36 begins to count the Slow Clocks. The counter 36 is represented in the transmitting state portion of the flowchart by a diamond-shaped box captioned with the question: "Counter > 7?" The transmission of the character of data from the loop transmitter 34 is indicated by a "NO" answer to the question.

When the counter 36 reaches a count of eight (indicating a "YES" answer to the question), the loop transmitter 34, and thus the output of the control device 14, is disabled and the input of the device 14 is enabled, as described above, whereby the device 14 goes back into its receiving state 0. The counter 36 continues to count until thirty-one is reached, and then it reinitializes back to zero. Thus, the control device 14 goes back to its receiving state 0 as soon as a count of eight is reached and before the mark hold condition of the loop transmitter 34 is disabled.

Figure 4:
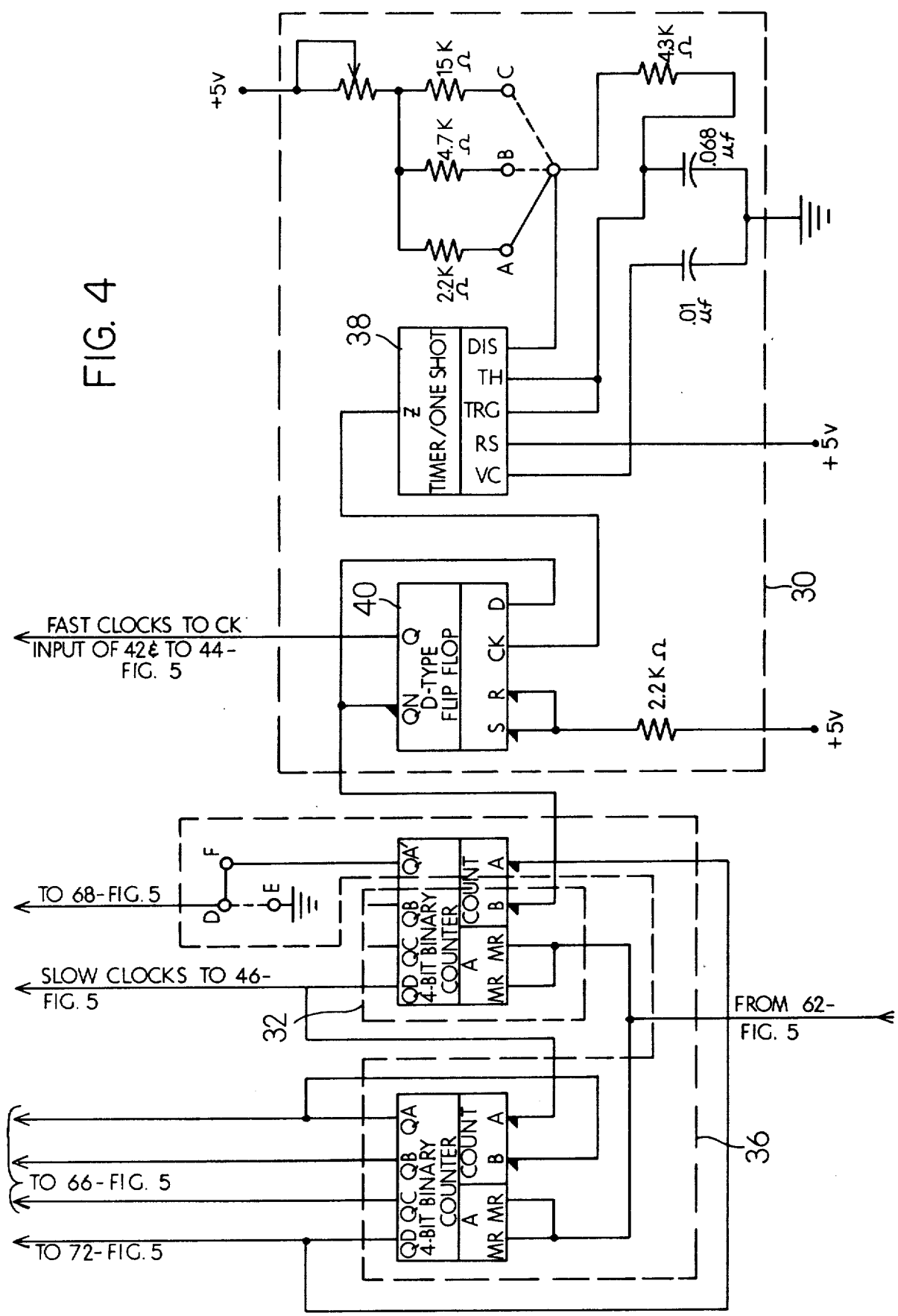
FIGS. 4, 5 and 6 together illustrate the preferred embodiment of the detailed electrical circuit which comprises the data rate control device.
Figure 5:
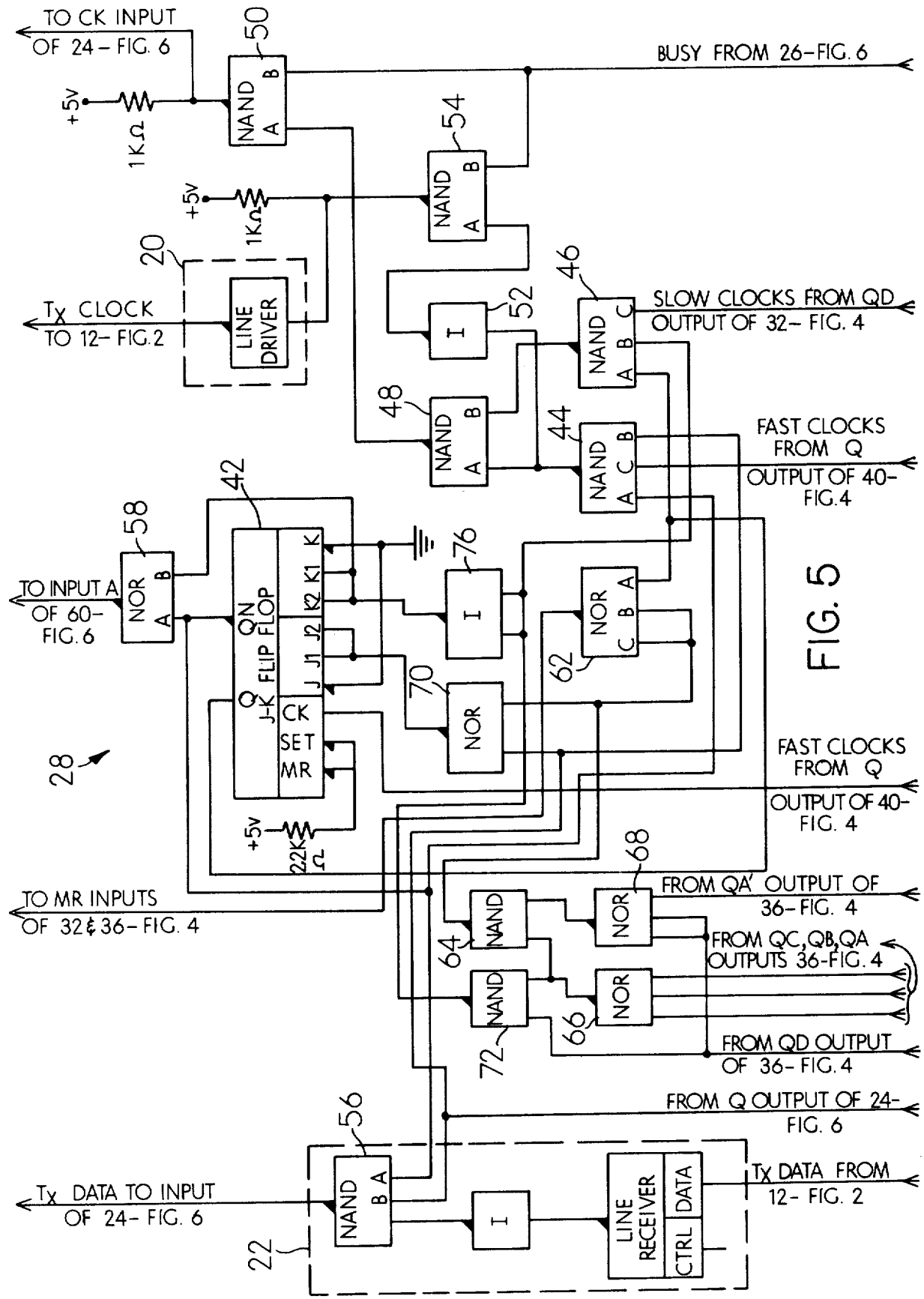
Figure 6:
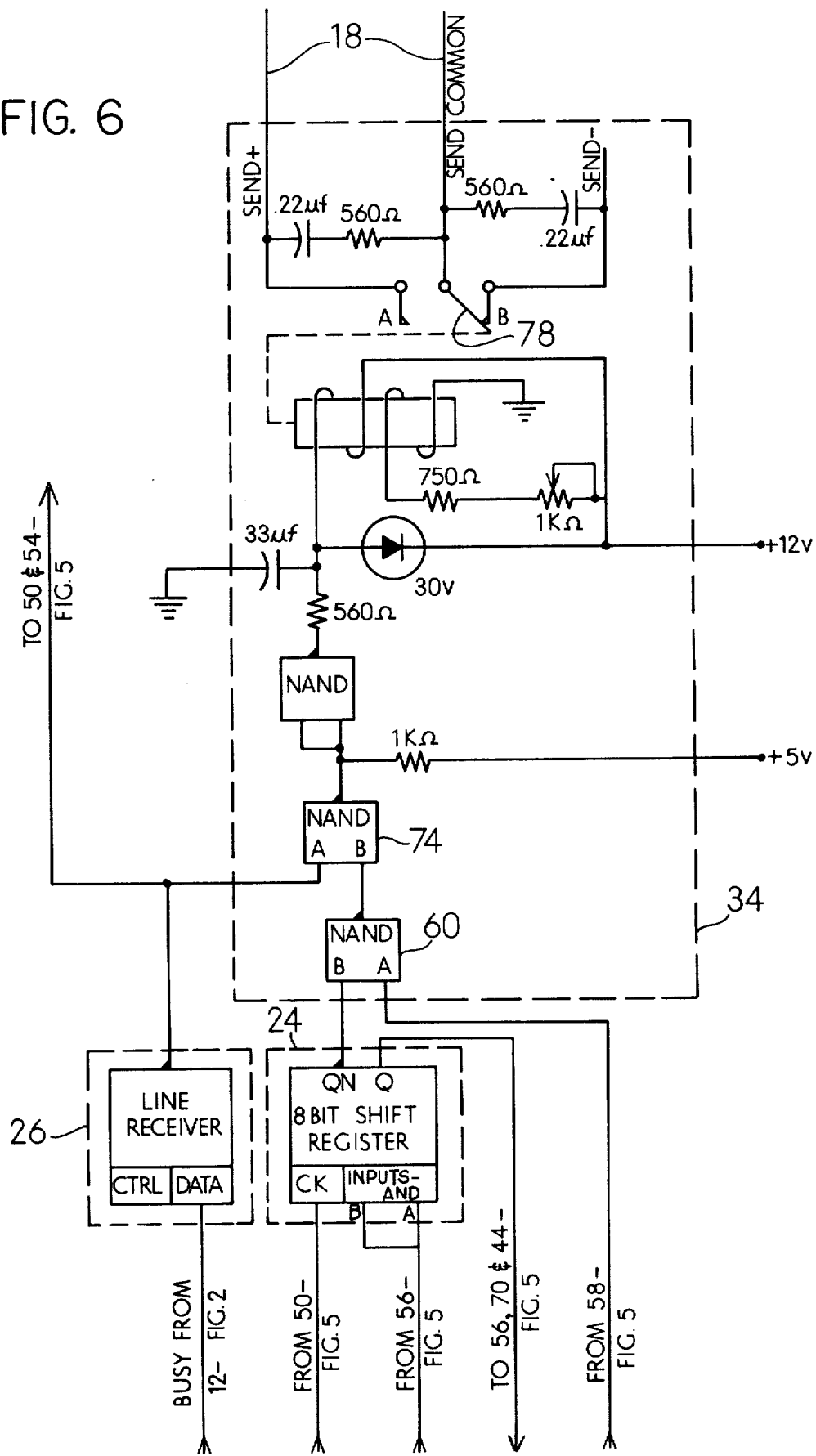

FIGS. 4, 5 and 6 illustrate the electrical circuit schematics which when taken together constitute the preferred embodiment of the data rate control device 14. The oscillator 30, clock divider 32 and counter 36 of the device 14 are illustrated in FIG. 4. The Tx clock transmitter 20 and data receiver 22 of the device 14 are shown in FIG. 5, with the remainder of the figure depicting the control logic 28 of the device 14. FIG. 6 shows the shift register 24, the Busy receiver 26 and the loop transmitter 34 of the device 14. The preferred embodiment of the data rate control device 14 of FIGS. 4, 5 and 6 can best be understood by describing the interaction between its parts at various stages of its operation occurring during its receiving and transmitting states.

During both of the states of the device 14, a timer 38 (FIG. 4) in the oscillator 30 is continuously generating substantially square wave pulses at a rate of 1600 Hz. which, in turn, causes square wave pulses referred to as Fast Clocks to be generated from the Q output of a D-type flip flop 40 of the oscillator 30 at a rate of 800 Hz. The clock divider 32 receives Fast Clocks from the QN output of flip flop 40 and divides them by eight so as to generate Slow Clocks from its QD output at a rate of 100 Hz.

First, assume that the device 14 is in its receiving state wherein it is set for receiving data from the SLA 12. Also, assume that its counter 36 is initialized at zero. Furthermore, during the following description, it will be assumed that no Busy (or high) signal which would interrupt the operation of the device 14 is being received from the SLA 12. Thus, the input of Busy receiver 26 (FIG. 6) is low and its output is high.

From the earlier explanation of the flowchart of FIG. 3, it will be recalled that when the device 14 is in its receiving state the control logic 28 will enable Fast Clocks to pass to the clock transmitter 20 for generation of Tx Clocks by the latter to the SLA 12 at a fast rate so that reading in of data to the data receiver 22 correspondingly will take place at a fast rate. Also, the control logic 28 will enable Fast Clocks to pass to the register 24 for the shifting in of data at a fast rate as the data is transferred to it by the receiver 22. Further, the control logic 28 enables the data receiver 22 so that it can transfer the data to the register 24. Still further, Slow Clocks are disabled by the control logic 28 from passing to the register 24 and are prevented by the control logic 28 from starting the counter 36 to count. Finally, the loop transmitter 34 is disabled by the control logic 28. By this time it should be readily apparent that for one to understand how the device 14 works, it is essential to understand the functions performed by the various parts of the control logic 28.

The control logic 28 includes a J-K flip flop 42 (FIG. 5) whose output states determine which state the device 14 is in. In the receiving state of the device 14, the flip flop 42 is set such that its Q output is low and its QN output is high. Other logic elements of the control logic 28, being seen in FIG. 5, constantly monitor the output states of the J-K flip flop 42 and by so doing allow or prevent the passage of Fast and Slow Clocks through the control logic 28.

On the one hand, in the receiving state of the device 14, a NAND gate 44 of the control logic 28 allows Fast Clocks to pass. Specifically, an input A of the NAND gate 44 is monitoring the QN output of the flip flop 42. Also, the NAND gate 44 at its input B is monitoring the Q output of the shift register 24, looking for the presence of a start bit 0. Fast Clocks are being applied from the oscillator 30 to the input C of the NAND gate 44. In order for the Fast Clocks to pass through the NAND gate 44, the signals applied to its inputs A and B must both be high. They both are high since the QN output of the flip flop 42 is high during the receiving state of the device 14 and the Q output of the register 24 is high since it is being assumed that a start bit 0 has not yet appeared at the Q output of the register. Thus, Fast Clocks are passed by the NAND gate 44.

On the other hand, during the receiving state of the device 14, a NAND gate 46 of the control logic 28 prevents the passage of Slow Clocks. Specifically, an input A of the NAND gate 46 is monitoring the Q output of the flip flop 42. Also, the NAND gate 46 at its input B is monitoring the output of other logic elements of the control logic 28 which sense the count of the counter 36. Suffice it to say for present purposes that when the counter 36 is at zero, the input B of the NAND gate 46 is low. The count sensing logic elements will be described in detail later. In order for the NAND gate 46 to prevent passage of the Slow Clocks, only one of its inputs A or B needs to be low. Its input A is low since the Q output of the flip flop 42 is low during the receiving state of the device 14. Thus, the output of the NAND gate 46 is high when Slow Clocks are prevented from passage through the gate.

The control logic 28 also includes successive NAND gates 48 and 50 which allow the passage of Fast Clocks received at their respective inputs A where their inputs B are high. Since the output of the NAND gate 46 is high, input B of NAND gate 48 is high. Since the output of Busy receiver 26 is high, the input B of NAND gate 50 is high. Thus, the Fast Clocks are passed through to the input CK of the register 24.

Still further, the control logic 28 includes, successively, an inverter 52 and a NAND gate 54 between the NAND gate 44 and the clock transmitter 20. Since the output of Busy receiver 26 is high, the input B of NAND gate 54 is high and, therefore, the Fast Clocks from the output of the NAND gate 44, which pass through the inverter 52 to the input A of the NAND gate 54, are passed through to the clock transmitter 20.

The clock transmitter 20, when receiving Fast Clocks from the control logic 28 as just described, generates and sends Tx Clocks to the SLA 12 which, in turn, frames and sends in a data bit to the data receiver 22 in response to each Tx Clock it receives. The data will be transferred through to the shift register by the data receiver 22 if the latter is enabled. When inputs A and B of a NAND gate 56 in the receiver 22 are both high, the receiver is enabled and data is transferred through. Input A of the NAND gate 56 is monitoring the QN output of the flip flop 42 of the control logic 28. Input B of the NAND gate 56 is monitoring the Q output of the shift register 24, looking for the presence of a start bit 0. Thus, the NAND gate 56 is monitoring the same conditions as those previously described with respect to the NAND gate 44 which controlled the passage of Fast Clocks. Both inputs A and B of the NAND gate 56 are high, since the QN output of the flip flop 42 is high during the receiving state of the device 14 and the Q output of the register 24 is high since it is being assumed that a start bit 0 has not yet appeared at the Q output of the register. Thus, the receiver 22 is enabled and data bits are transferred through to the register 24.

The last two conditions to be described when the device 14 is in its receiving state and it is assumed that its counter 36 is zero are that the loop transmitter 34 is disabled by the control logic 28 and Slow Clocks are prevented from starting the counter 36 to count.

With respect to disablement of the loop transmitter, the output of a NOR gate 58 of the control logic 28 is low since the QN output of the J-K flip flop 42, which the NOR gate 58 is monitoring at its input A, is high during the receiving state of the device 14. Since the output of the NOR gate 58 is low, the input A of a NAND gate 60 (FIG. 6) in the loop transmitter 34 is low and data from the QN output of the register 24 is prevented from being shifted out of the register 24 and through the NAND gate 60 at its input B. Thus, so long as input A of the loop transmitter's NAND gate 60 is low, the loop transmitter 34 is disabled.

With respect to holding the counter 36 at a zero count, the output of a NOR gate 62 (FIG. 5) in the control logic 28 is high which prevents the counter 36 from counting. Specifically, input A of the NOR gate 62 is monitoring the Q output of the J-K flip flop 42. Since the Q output of the flip flop 42 is low during the receiving state of the device 14, the input A of the NOR gate 62 is low. Inputs B and C of the NOR gate 62, which are coupled together, monitor the output of a NAND gate 64 of the count sensing logic elements of the control logic 28. When the count is zero, the output of the NAND gate 64 is low and, therefore, the inputs B and C of the NOR gate 62 are both low. Consequently, since all inputs of the NOR gate 62 are low, its output is high.

It was just mentioned that when the count of the counter 36 equals zero, the output of NAND gate 64 is low. For this to be true, the outputs of NOR gates 66, 68, being two more count sensing logic elements of the control logic 28, must be high. Since the QD, QC, QB, QA and QA' outputs of the counter 36 are all low when the counter 36 is at binary 0, all inputs to the NOR gates 66, 68 are low and, thus, their outputs are high.

In the preceding description of the receiving state of the device 14, the stage of its operation described was that occurring before a start bit 0 appears at the Q output of the shift register 24. When a start bit 0 does appear at the Q output of the register 24 and is sensed by the control logic 28, indicating that the register 24 is filled up with one character of data, the device 14 enters its next succeeding stage of operation, the transmitting state.

The device 14 is changed from its receiving to its transmitting state when the control logic 28, upon sensing the presence of the start bit 0, disables the passage of Fast Clocks to the clock transmitter 20 and the register 24, disables the data receiver 22, enables the loop transmitter 34 and the passage of Slow Clocks to the register 24, and, finally, enables the counter 36 to begin counting. It should be mentioned here that during both of the states of the device 14, Fast Clocks are constantly applied to the input CK of the J-K flip flop 42 for maintaining it ready to switch between the respective states.

The sequence of events which occurs as a result of the appearance of a start bit 0 at the Q output of the register 24 is triggered by the resultant switching of the output states of the J-K flip flop 42 of the control logic 28. It will be remembered that in the receiving state of the device 14, the flip flop 42 was set such that its Q output was low and its QN output was high. At the appearance of the start bit 0, the Q output of the flip flop 42 is switched to high, while its QN output goes low. Such switching is caused by a NOR gate 70 (FIG. 5) in the control logic 28 which at its inputs A and B is respectively monitoring the Q output of the register 24 and the output of the count-sensing NAND gate 64. In the receiving state before the start bit 0 appeared, the output of the NOR gate 70 was low since the Q output of the register 24 was high. However, since the Q output of the register 24 goes low upon the appearance of the start bit 0 and the output of the NAND gate 64 is low because the count of the counter 36 is zero, both inputs A and B of the NOR gate 70 are now low and its output becomes high. The switching of the output of the NOR gate 70 from low to high causes the flip flop 42 to switch, i.e., its Q output to go high and its QN output to go low.

Other logic elements of the control logic 28, which were previously described as monitoring the output states of the J-K flip flop 42, will now also switch. Specifically, on the one hand, the input A of the NAND gate 44 goes low when the QN output of the flip flop 42 goes low, thereby preventing the passage of Fast Clocks to either the Tx clock transmitter 20 or the register 24. Also, the input B of the NAND gate 44 goes low when the Q output of the register goes low at the appearance of the start bit 0. With both of its inputs switched to low, the output of the NAND gate 44 is high. On the other hand, the input A of the NAND gate 46 goes high when the Q output of the flip flop 42 goes high. Also, the input B of the NAND gate 46 is high since the output of another NAND gate 72 of the count sensing logic elements is high when the count of the counter 36 is not equal to a binary 8, as will be explained later. Thus, with the inputs A and B of the NAND gate 46 both high, Slow Clocks are allowed to pass. Since input A of the NAND gate 48 is high due to the output of the NAND gate 46 being high and since the input B of the NAND gate 50 is high in the absence of an interrupt Busy signal, the Slow Clocks are allowed to pass on to the input CK of the register 24 for causing the slow reading out of the data character from the register 24.

The loop transmitter 34 is enabled by the output of the NOR gate 58 (FIG. 5) changing from low to high. Correspondingly, this causes the input A of the NAND gate 60 (FIG. 6) to go high and allow the data character to be read out from the QN output of the register 24 through the input B of the NAND gate 60. Furthermore, since another NAND gate 74 (FIG. 6) in the transmitter 34 is high at its input A due to the absence of an interrupt Busy signal, the data character passes through its input B. Thus, each Slow Clock received at the input CK of the register 24 causes one data bit to be read out to the transmitter 34 and transmitted by the latter on communication line 18.

Before proceeding on, it would be desirable to describe why the NOR gate 58 (FIG. 5) changed from low to high. The input A of the NOR gate 58 is low since the QN output of the J-K flip flop 42 is low during the transmitting state of the device 14. The input B of the NOR gate 58 is also low since the high output of the count-sensing NAND gate 72 is inverted to low by an inverter 76 (FIG. 5) of the control logic 28.

The data receiver 22 is disabled by the input A of the NAND gate 56 in the receiver 22 going low due to the low at the QN output of the J-K flip flop 42. Also, the input B of the NAND gate 56 goes low when the start bit 0 appears at the Q output of the register.

Finally, the counter 36 is enabled to begin counting the Slow Clocks it receives from the clock divider 32 by the output of the NOR gate 62 going low. Specifically, input A of the NOR gate 62 goes high since the Q output of the flip flop 42 is high.

When the counter reaches a count of binary 8, the device 14 enters a third stage in its operation wherein it changes back to the receiving state. A count of eight indicates that the character of data, comprised of eight bits as seen in FIG. 7, has been read out of the register 24 and transmitted on the communication line 18 by the transmitter 34.

When the device 14 changes back to its receiving state, the J-K flip flop 42 output states are again switched such that the Q output goes low and the QN output goes high. Such change in output states is brought about by the output of the clock-sensing NAND gate 72 which goes low when the count of the counter 36 equals a binary 8. Specifically, when the count is a binary 8 or 1000, the QD output of the counter 36 is high; while its QC, QB and QA outputs are low. Thus, all inputs to the NOR gate 66 are low and its output is high. Also, both inputs to the NAND gate 72 are high so its output is low. The low output of the NAND gate 72 is inverted by the inverter 76, and a high is applied to flip flop 42 and to the input B of the NOR gate 58. The high applied to the flip flop 42 changes its Q output to low and its QN output to high.

Also, Slow Clocks to the register 24 are momentarily disabled by the low output from the clock-sensing NAND gate 72 which is applied to input B of the NAND gate 46. As soon as the count exceeds eight, the output of the NAND gate 72 changes to high and so does the input B of the NAND gate 46; however, the input A of the NAND gate 46 has gone low by this time since the Q output of the flip flop 42 has gone low. Therefore, the input A of the NAND gate 46 will stay low and prevent passage of Slow Clocks to the register.

Fast Clocks are now enabled to pass through NAND gate 44 since the QN output of the flip flop 42 is high and the Q output of the register is high (in absence of a start bit 0). Thus, Fast Clocks are again sent to the Tx clock transmitter 20 and to the input CK of the register 24 to cause reading in of data from the SLA 12. Also, when the Q output of the register goes high and the QN output of the flip flop 42 goes high, the data receiver 22 is again enabled to transfer the incoming data to the register 24.

Finally, the loop transmitter 34 is disabled when the count reaches eight, since the high inputs to the NOR gate 58 cause it to output a low to the input A of the NAND gate 60 of the transmitter 34.

It should be noted that even though the device 14 has changed back to its receiving state and data is being read in to the register 24 again at a fast rate, the counter 36, after reaching a count of eight, continues to count up to thirty-one before reinitializing to zero. The output of the NOR gate 62 stays low even though its input A has gone low due to the Q output of the flip flop 42 going low, since the inputs B and C stay high because the output of the count-sensing NAND gate 64 is high until a count of zero is sensed.

Should a start bit 0 appear at the Q output of the register 24 before the counter 36 has reached a count of thirty-one and returned to zero, the device will idle in its receiving state, being prevented from returning to the transmitting state until the count is zero. Specifically, the output states of the J-K flip flop 42 will not switch until the output of the NOR gate 70 goes high. However, since its input B is monitoring the output of the count-sensing NAND gate 64, the input B is high because the output of the NAND gate 64 is high until a zero count is sensed. Thus, the output of the NOR gate 70 remains low until the counter 36 has reinitialized back to zero. If a start bit 0 is present at the Q output of the register 24 when the count of the counter 36 returns to zero, the device 14 immediately changes to the transmitting state.

As was explained heretofore, upon the counter 36 reaching a count of eight, the loop transmitter 34 is disabled. This effectively places it in a mark hold condition. This condition is maintained until the counter 36 reaches a count of thirty-one and reinitializes to zero. Therefore, the mark hold condition lasts for twenty-four Slow Clock counts which is a duration three times the length of time it takes for the transmission of a character of data. The mark hold period insures that there will be sufficient time between data transmissions for reflections and echoes on the communication line 18 to die down.

In the mark hold condition, the current loop of the communication line 18 is closed as would be represented when a switch 78, in FIG. 6, is in contact with a terminal A. When the switch 78 is in contact with terminal B, as depicted in FIG. 6, the current loop is broken or open. The closed condition is represented as a binary 1, while the open condition represents a binary 0. During data transmissions the loop will open and close depending upon the particular arrangement of binary 1s and 0s making up the data character.

Also, the open condition of the loop is brought about when an interrupt Busy (or high) signal is received from the SLA 12 by the Busy receiver 26 (FIG. 6). The receiver 26 then outputs a low which disables the transmitter 34 at its NAND gate 74, the passage of either Fast or Slow Clocks at the NAND gate 50, and the passage of Fast Clocks at the NAND gate 54.

It should also be pointed out that the output from the loop transmitter 34 on the communication line 18 can be transmitted at three different rates: 50, 75 or 100 baud. Transmission of output at these rates, in turn, causes the input of data to the control device 14 at three different rates: 400, 600 or 800, respectively. The oscillator 30 of the device 14, which generates Fast Clocks to the control logic 28 and to the clock divider 32 for producing Slow Clocks by the latter, is strappable at C, B or A positions for correspondingly enabling the above-described output and input rates.

Also, the device 14 is changeable between a quarter speed transmitting mode and a half speed transmitting mode. In the quarter speed transmitting mode, the loop transmitter 34 is held in a mark hold condition for the duration of three characters or twenty-four bits of time after each transmission of one character (eight bits) of data. This is the normal mode of the device 14. However, if it is desired to transmit data more quickly, allowing less time for reflections and echoes to die down on the line 18, the device 14 can be changed to the half speed mode which means that the loop transmitter 34 will be held in a mark hold condition for the duration of only one character or eight bits of time after each transmission of one character (eight bits) of data. For implementing the quarter speed mode, the counter 36 is strapped from $E_1$ to $E_2$, while for the half speed mode, it is strapped from $E_1$ to $E_3$. When the counter 36 is strapped for quarter speed mode, it reinitializes to zero after reaching a count of thirty-one. The counter 36 reinitializes to zero after reaching a count of fifteen, when it is strapped for half speed mode.

Having thus described the invention, what is claimed is:

1. A method of controlling the rate at which data is transferred from a computer to a communication line, comprising the steps of:
   (A) generating fast clocks at a first predetermined rate;
   (B) generating slow clocks at a second predetermined rate being less than said first predetermined rate at which said fast clocks are generated;
   (C) enabling the application of said fast clocks to said computer and to a register to cause the reading in of bits of data from said computer to said register;
   (D) monitoring said register to detect the presence of a preselected character of data bits in said register, said character of data bits containing a known number of bits;
   (E) disabling said application of said fast clocks to said computer and said register upon the presence of a first said preselected character of data bits being detected in said register;
   (F) enabling the application of said slow clocks to said register, upon the presence of the first said character of data bits being detected in said register, to cause the reading out of the first said character of data bits from said register;
   (G) transmitting onto said communication line the first said character of data bits read out from said register;
   (H) applying said slow clocks to a counter;
   (I) enabling said counter to count said slow clocks simultaneous with said enabling of the application of said slow clocks to said register upon the presence of the first said character of data bits being detected in said register; and
   (J) monitoring the count of said slow clocks by said counter for
      (i) disabling the application of said slow clocks to said register when said counter reaches a first predetermined count equal to said given number of bits contained in said preselected character of data bits indicating that the first said character of data bits has been read out of said register,
      (ii) enabling the application of fast clocks to said computer and register to cause, as a repetition of step (C), the reading in of a second said character of data bits from said computer to said register when said counter reaches said first predetermined count, and
      (iii) allowing said application of said fast clocks to said computer and register to be disabled, as a repetition of step (E), should the presence of the second said character of data bits be detected, upon a repetition of step (D), in said register but preventing the enabling of the application of slow clocks to said register to cause, as a repetition of step (F), the reading out of the second said character of data bits from said register and onto said communication line until after said counter reaches a second predetermined count greater than said first count which defines the lapse of a predetermined amount of time sufficient for reflections on said communication line from the transmission of the first said character of data bits to die down.

2. A control device for controlling the rate at which data is transferred from a computer to a communication line, comprising:

means interconnected to said computer for receiving data bits therefrom and storing a character of said data bits, said character being composed of a predetermined number of bits including a preselected start bit which will be located at a predetermined position in said storing means when said character is present in said storing means;

transmitting means interconnecting said storing means and said communication line for receiving said character from said storing means and causing transmission of said character on said communication line;

means for generating fast clocks at a first predetermined rate and slow clocks at a second predetermined rate being less than said first predetermined rate at which said fast clocks are generated;

switching means connected to said transmitting means and having a first data receiving state and a second data transmitting state, said switching means when in its first state disabling said transmitting means from causing transmission of said character on said communication line and when in its second state enabling said transmitting means to cause transmission of said character on said communication line;

first means connected to said generating means for receiving said fast and slow clocks therefrom, said first means also being connected to said switching means for monitoring and sensing the state of said switching means, said first means further being connected to said storing means for detecting the presence and absence of said start bit at and from said predetermined position in said storing means, said first means still further being connected to said storing means and said computer for enabling the transfer of fast clocks to said storing means and said computer and disabling the transfer of slow clocks to said storing means to cause the reading in of data bits to said storing means from said computer at said first predetermined rate when said switching means is sensed in its first state and the absence of said start bit from said predetermined position in said storing means is detected by said first means, said first means also for enabling the transfer of slow clocks to said storing means and disabling the transfer of fast clocks to said storing means and said computer to cause the reading out of said character of data bits from said storing means at said second predetermined rate when said switching means is sensed in its second state and the presence of said start bit is detected at said predetermined position in said storing means by said first means;

means connected to said generating means for receiving said slow clocks therefrom and counting the same; and second means connected to said storing means for detecting the presence and absence of said start bit at and from said predetermined position in said storing means, said second means also being connected to said counting means for monitoring and sensing the count of said counting means, said second means further being connected to said switching means and operable to cause said switching means to change from its second to first state when said second means senses a first predetermined count reached by said counting means which is equal to said predetermined number of bits composing said character of data bits and thereby indicative that said character of data bits has been read out of said storing means, said second means being further operable to cause said switching means to change from its first to second state when the presence of said start bit at said predetermined position in said storing means is detected by said second means and a second predetermined count greater than said first count is reached by said counting means and sensed by said second means which defines the lapse of a predetermined amount of time, after the sensing of said first count and transmission of a character of data bits on said communication line due to the change of said switching means from its first to second state, sufficient for reflections on said communication line from the transmission of the character of data bits to die down.

3. The control device as recited in claim 2 wherein the amount of time it takes for said counting means to reach said second count is three times that which it takes for said counting means to reach said first count.

4. The control device as recited in claim 2 wherein said counting means is operable to return to a zero count upon reaching said second count, said counting means also being connected to said first means and enabled by said first means to begin counting slow clocks when the transfer of the latter to said storing means is enabled by said first means.

* * * * *